(12) United States Patent
Zhao et al.

(10) Patent No.: US 11,655,120 B2
(45) Date of Patent: May 23, 2023

(54) ELEVATOR LOAD BEARING MEMBER INCLUDING A UNIDIRECTIONAL WEAVE

(71) Applicant: OTIS ELEVATOR COMPANY, Farmington, CT (US)

(72) Inventors: Chen Qian Zhao, Newark, DE (US); Kyle B. Martin, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 951 days.

(21) Appl. No.: 16/456,318

(22) Filed: Jun. 28, 2019

(65) Prior Publication Data

US 2020/0407194 A1 Dec. 31, 2020

(51) Int. Cl.
*B66B 7/06* (2006.01)
*B29D 29/00* (2006.01)
*D07B 1/02* (2006.01)
*D07B 1/16* (2006.01)
*D07B 1/22* (2006.01)
*D07B 5/04* (2006.01)

(52) U.S. Cl.
CPC .............. *B66B 7/062* (2013.01); *B29D 29/00* (2013.01); *D07B 1/02* (2013.01); *D07B 1/162* (2013.01); *D07B 1/22* (2013.01); *D07B 5/045* (2021.01); *D07B 2201/2087* (2013.01); *D07B 2501/2007* (2013.01)

(58) Field of Classification Search
CPC .......... B66B 7/062; B29D 29/00; D07B 1/02; D07B 1/162; D07B 5/045; D07B 1/22; D07B 2201/2087; D07B 2501/2007
See application file for complete search history.

(56) References Cited

U.S. PATENT DOCUMENTS

| | | | | | |
|---|---|---|---|---|---|
| 3,446,002 | A | * | 5/1969 | Kippan | D07B 1/04 428/401 |
| 3,673,023 | A | * | 6/1972 | Ross | B41N 10/04 474/271 |
| 4,228,641 | A | * | 10/1980 | O'Neil | D07B 5/005 57/7 |
| 4,275,117 | A | * | 6/1981 | Crandall | A63B 51/02 428/394 |
| 4,433,536 | A | * | 2/1984 | O'Neil | D07B 5/005 57/235 |
| 4,510,743 | A | * | 4/1985 | de Kroon | D01F 8/00 57/238 |
| 4,887,422 | A | * | 12/1989 | Klees | D07B 1/0686 57/220 |
| 5,060,466 | A | * | 10/1991 | Matsuda | D07B 1/025 57/232 |
| 5,771,673 | A | * | 6/1998 | Lorch | D02G 3/402 57/232 |
| 5,881,843 | A | * | 3/1999 | O'Donnell | D07B 1/025 187/254 |

(Continued)

*Primary Examiner* — Michael A Riegelman
(74) *Attorney, Agent, or Firm* — Carlson, Gaskey & Olds, P.C.

(57) ABSTRACT

An illustrative example embodiment of an elevator load bearing member includes a unidirectional weave of a plurality of load bearing fibers including at least a first material and a second material. A melting point of the first material is higher than a melting point of the second material. The plurality of load bearing fibers are bonded together by at least some of the second material that is at least partially melted. A coating covers the plurality of load bearing fibers.

16 Claims, 2 Drawing Sheets

(56) References Cited

U.S. PATENT DOCUMENTS

| | | | | |
|---|---|---|---|---|
| 6,148,597 A * | 11/2000 | Cook | ............... | D02G 3/40 87/13 |
| 6,318,504 B1 * | 11/2001 | De Angelis | ............... | D07B 1/167 57/235 |
| 6,364,063 B1 * | 4/2002 | Aulanko | ............... | B66B 11/08 187/265 |
| 7,032,371 B2 * | 4/2006 | Smith | ............... | B66B 7/06 57/237 |
| 7,147,904 B1 * | 12/2006 | Crawford | ............... | D02G 3/38 174/DIG. 11 |
| 7,568,419 B2 * | 8/2009 | Bosman | ............... | D07B 1/025 87/8 |
| 7,757,472 B2 * | 7/2010 | Dold | ............... | D07B 1/025 57/236 |
| 7,784,258 B2 * | 8/2010 | Hess | ............... | D07B 1/02 57/210 |
| 7,823,496 B2 * | 11/2010 | Bosman | ............... | D07B 1/025 87/9 |
| 8,181,438 B2 * | 5/2012 | Cook | ............... | A01K 91/00 57/238 |
| 8,881,496 B2 * | 11/2014 | Bosman | ............... | D04C 1/12 57/258 |
| 9,050,768 B2 * | 6/2015 | Urbani | ............... | B29C 43/3697 |
| 9,816,211 B2 * | 11/2017 | Wagner | ............... | A01K 91/00 |
| 9,828,214 B2 * | 11/2017 | Pelto-Huikko | ............... | D07B 5/10 |
| 9,828,215 B2 * | 11/2017 | Pelto-Huikko | ............... | B66B 7/062 |
| 9,834,409 B2 * | 12/2017 | Kere | ............... | B66B 5/0018 |
| 9,834,872 B2 * | 12/2017 | Tam | ............... | D07B 5/12 |
| 9,988,241 B2 * | 6/2018 | Lehtinen | ............... | D07B 1/142 |
| 9,994,424 B2 * | 6/2018 | Kere | ............... | B66B 9/00 |
| 11,418,782 B2 * | 8/2022 | Lamkin | ............... | H04N 19/115 |
| 2006/0137896 A1 * | 6/2006 | O'Donnell | ............... | D02G 3/447 174/117 F |
| 2008/0282664 A1 * | 11/2008 | Chou | ............... | D07B 1/025 57/309 |
| 2011/0259677 A1 * | 10/2011 | Dudde | ............... | D07B 5/006 187/411 |
| 2013/0153126 A1 * | 6/2013 | Knox | ............... | B32B 37/15 156/499 |
| 2014/0291076 A1 * | 10/2014 | Guilani | ............... | B66B 7/062 57/216 |
| 2015/0113936 A1 * | 4/2015 | Amils | ............... | D07B 1/162 57/7 |
| 2015/0191331 A1 * | 7/2015 | Orelup | ............... | B66B 7/062 264/177.2 |
| 2015/0191332 A1 * | 7/2015 | Kere | ............... | B66B 7/1223 428/297.4 |
| 2015/0307321 A1 * | 10/2015 | Breite | ............... | B66B 7/06 187/254 |
| 2016/0207739 A1 * | 7/2016 | Pelto-Huikko | ............... | B66B 9/00 |
| 2017/0066630 A1 * | 3/2017 | Gurvich | ............... | B29C 70/12 |
| 2017/0101293 A1 * | 4/2017 | Eastman | ............... | D03D 15/43 |
| 2017/0145631 A1 * | 5/2017 | Rommel | ............... | D03D 1/0043 |
| 2017/0217729 A1 * | 8/2017 | Lehtinen | ............... | D07B 1/22 |
| 2018/0155870 A1 * | 6/2018 | Eastman | ............... | D07B 1/162 |
| 2018/0215946 A1 * | 8/2018 | Zhao | ............... | C09D 9/04 |
| 2018/0282125 A1 * | 10/2018 | Zhao | ............... | D07B 1/16 |
| 2018/0305177 A1 * | 10/2018 | Zhao | ............... | D07B 1/165 |
| 2018/0305178 A1 * | 10/2018 | Martin | ............... | D07B 1/005 |
| 2018/0305180 A1 * | 10/2018 | Guilani | ............... | B66B 7/062 |
| 2018/0305181 A1 * | 10/2018 | Zhao | ............... | F16G 5/14 |
| 2018/0305182 A1 * | 10/2018 | Zhao | ............... | F16G 5/10 |
| 2018/0305866 A1 * | 10/2018 | Zhao | ............... | B66B 23/24 |
| 2019/0047821 A1 * | 2/2019 | Zhao | ............... | B66B 7/062 |
| 2019/0062114 A1 * | 2/2019 | Zhao | ............... | C08K 5/0066 |
| 2019/0062115 A1 * | 2/2019 | Zhao | ............... | B66B 9/00 |
| 2019/0062116 A1 * | 2/2019 | Zhao | ............... | F16G 1/16 |
| 2019/0144241 A1 * | 5/2019 | Guilani | ............... | B66B 9/00 187/251 |
| 2019/0144243 A1 * | 5/2019 | Zhao | ............... | D06M 13/152 187/411 |
| 2019/0161321 A1 * | 5/2019 | Zhao | ............... | B66B 7/06 |
| 2019/0161322 A1 * | 5/2019 | Zhao | ............... | C08G 18/833 |
| 2019/0168999 A1 * | 6/2019 | Guilani | ............... | B66B 7/062 |
| 2019/0322488 A1 * | 10/2019 | Martin | ............... | B66B 7/062 |
| 2020/0002132 A1 * | 1/2020 | Mosher | ............... | D07B 1/0686 |
| 2020/0031623 A1 * | 1/2020 | Martin | ............... | D07B 1/025 |
| 2020/0031624 A1 * | 1/2020 | Martin | ............... | B66B 3/00 |
| 2020/0048043 A1 * | 2/2020 | Zhao | ............... | D07B 1/162 |
| 2020/0407194 A1 * | 12/2020 | Zhao | ............... | D07B 1/02 |
| 2021/0024328 A1 * | 1/2021 | Zhao | ............... | B66B 7/062 |
| 2021/0062414 A1 * | 3/2021 | Zhao | ............... | D07B 1/162 |

* cited by examiner

_US 11,655,120 B2_

ELEVATOR LOAD BEARING MEMBER INCLUDING A UNIDIRECTIONAL WEAVE

BACKGROUND

A variety of elevator systems are known. Some elevator systems use a hydraulic arrangement for moving the elevator car. Others are traction-based and include roping that suspends the elevator car and a counterweight. A machine causes movement of a traction sheave that, in turn, causes movement of the roping for moving the elevator car as desired.

For many years, roping in elevator systems included round steel ropes. More recently, flat belt technologies were developed that provided advantages over traditional, round steel rope arrangements. Even with the advancement, those skilled in the art have been striving to improve elevator load bearing member technology.

SUMMARY

An illustrative example embodiment of an elevator load bearing member includes a unidirectional weave of a plurality of load bearing fibers including at least a first material and a second material. A melting point of the first material is higher than a melting point of the second material. The plurality of load bearing fibers are bonded together by at least some of the second material that is at least partially melted. A coating covers the plurality of load bearing fibers.

In an example embodiment having one or more features of the elevator load bearing member of the previous paragraph, the first material comprises a first type of polymer, the second material comprises a second type of polymer, at least some of the load bearing fibers comprise the first type of polymer and at least some others of the load bearing fibers comprise the second type of polymer.

In an example embodiment having one or more features of the elevator load bearing member of any of the previous paragraphs, at least some of the load bearing fibers comprise the first material and the second material.

In an example embodiment having one or more features of the elevator load bearing member of any of the previous paragraphs, the coating comprises a jacket that defines a traction surface of the elevator load bearing member.

In an example embodiment having one or more features of the elevator load bearing member of any of the previous paragraphs, the jacket comprises a thermoplastic material and the coating comprises an adhesive between the thermoplastic material and at least some of the load bearing fibers.

In an example embodiment having one or more features of the elevator load bearing member of any of the previous paragraphs, a ratio of the first material to the second material is 1:1.

In an example embodiment having one or more features of the elevator load bearing member of any of the previous paragraphs, a ratio of the first material to the second material is 2:1.

In an example embodiment having one or more features of the elevator load bearing member of any of the previous paragraphs, a ratio of the first material to the second material is 3:2.

In an example embodiment having one or more features of the elevator load bearing member of any of the previous paragraphs, the first material comprises at least one of carbon, liquid crystal polymer, aramid, polyhydroquinone-diimidazopyridine, polybenzimidazole, polypyridobisimidazole and polybenzoxazole; and the second material comprises at least one of ultrahigh molecular weight polyethylene and ultrahigh molecular weight polypropylene.

An illustrative example embodiment of a method of making an elevator load bearing member includes unidirectional weaving a plurality of load bearing fibers including at least a first material and a second material. A melting point of the first material is higher than a melting point of the second material. The method includes bonding the load bearing fibers together by at least partially melting at least some of the second material and coating the plurality of load bearing fibers.

In an example embodiment having one or more features of the method of the previous paragraph, the first material comprises a first type of polymer, the second material comprises a second type of polymer, at least some of the load bearing fibers comprise the first type of polymer, and at least some others of the load bearing fibers comprise the second type of polymer.

In an example embodiment having one or more features of the method of any of the previous paragraphs, at least some of the load bearing fibers comprise the first material and the second material.

In an example embodiment having one or more features of the method of any of the previous paragraphs, the coating comprises applying a jacket onto the load bearing fibers and the jacket defines a traction surface of the elevator load bearing member.

In an example embodiment having one or more features of the method of any of the previous paragraphs, the jacket comprises a thermoplastic material and the coating comprises applying an adhesive onto the load bearing fibers between the thermoplastic material and at least some of the load bearing fibers.

In an example embodiment having one or more features of the method of any of the previous paragraphs, the bonding comprises heating and applying pressure to the load bearing fibers.

In an example embodiment having one or more features of the method of any of the previous paragraphs, the heating includes exposing the load bearing fibers to a temperature that is at least as high as the melting point of the second material and below the melting point of the first material.

In an example embodiment having one or more features of the method of any of the previous paragraphs, the bonding comprises pressing the load bearing fibers between first rollers that are heated and pressing the load bearing fibers between second rollers that are not heated.

In an example embodiment having one or more features of the method of any of the previous paragraphs, a ratio of the first material to the second material is between 1:1 and 4:1.

In an example embodiment having one or more features of the method of any of the previous paragraphs, the ratio is 2:1.

In an example embodiment having one or more features of the method of any of the previous paragraphs, the first material comprises at least one of carbon, liquid crystal polymer, aramid, polyhydroquinone-diimidazopyridine, polybenzimidazole, polypyridobisimidazole and polybenzoxazole; and the second material comprises at least one of ultrahigh molecular weight polyethylene and ultrahigh molecular weight polypropylene.

The various features and advantages of at least one disclosed example embodiment will become apparent to those skilled in the art from the following detailed description. The drawings that accompany the detailed description can be briefly described as follows.

DETAILED DESCRIPTION

Figure 1:
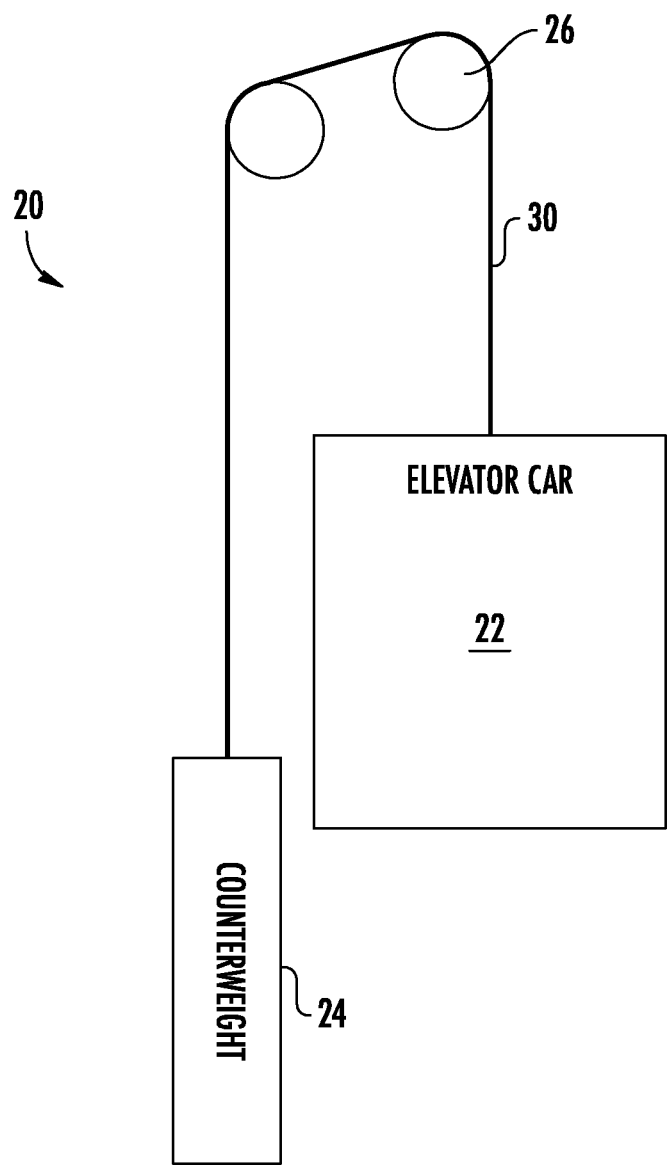
FIG. 1 schematically illustrates selected portions of an elevator system including a load bearing member designed according to an embodiment of this invention.

FIG. 1 schematically shows selected portions of an elevator system 20 including an elevator car 22 and counterweight 24. A traction sheave 26 associated with a machine (not specifically illustrated) selectively controls movement of a load bearing member 30, which suspends the elevator car 22 and counterweight 24, to control the movement or position of the elevator car 22. For illustration purposes, a single load bearing member 30 is represented in FIG. 1. Multiple load bearing members would be included in many embodiments.

Figure 2:
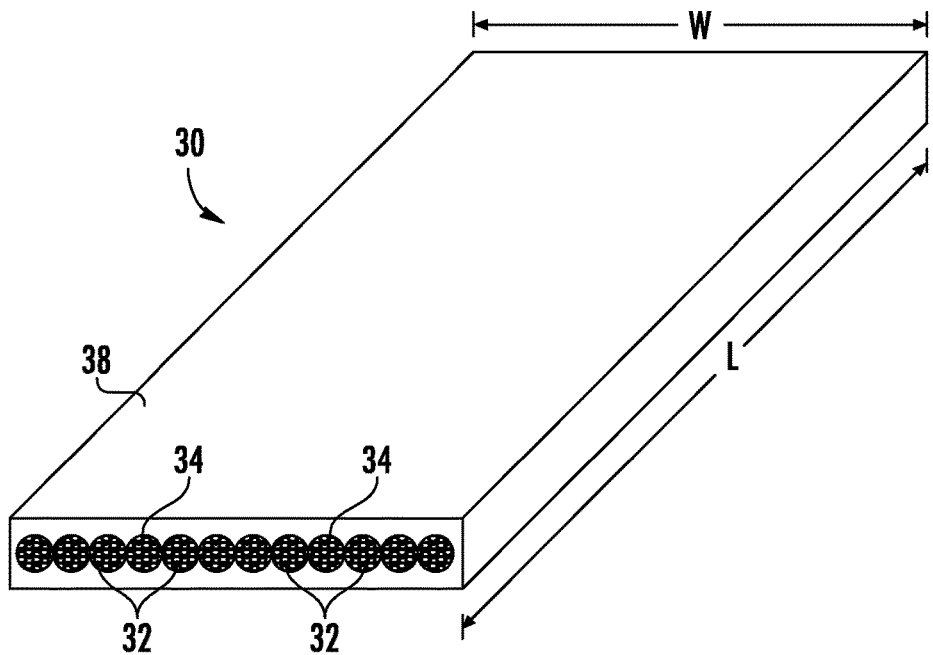
FIG. 2 schematically illustrates an example embodiment of an elevator load bearing member.

FIG. 2 schematically illustrates an example load bearing member 30. A plurality of load bearing fibers 32 serve as the primary load bearing components of the load bearing member 30. The load bearing fibers 32 are woven into a unidirectional weave. The load bearing fibers 32 are arranged as warp fibers extending in a length direction L of the load bearing member 30. A unidirectional weave has fibers extending in a single direction and does not include weft fibers that would be parallel to a width direction W of the load bearing member.

In some embodiments the unidirectional weave may include some weft fibers transverse to the single direction of the warp fibers but such weft fibers are far fewer in number than the warp fibers and are not considered significant to the load bearing performance of the unidirectional weave. Any such weft fibers may serve a limited purpose during manufacturing, for example.

Weaving the load bearing fibers into a unidirectional weave avoids any braiding of the fibers and, therefore, provides improved strength characteristics compared to other types of weaves. A unidirectional weave of load bearing fibers 32 also provides improved flexibility characteristics.

Figure 3:
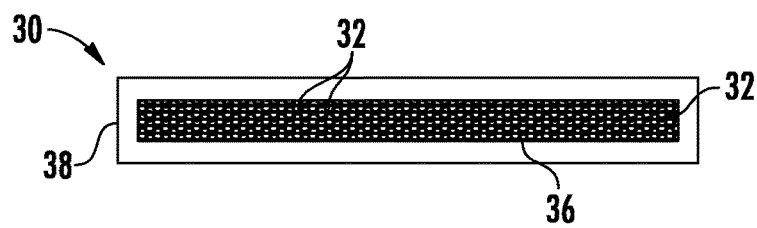
FIG. 3 is an end view of another example embodiment of an elevator load bearing member.

In the embodiment shown in FIG. 2, the load bearing fibers 32 are arranged or grouped as cords 34 and the cords 34 are woven into the unidirectional weave. In the embodiment shown in FIG. 3, the load bearing fibers 32 are individually woven into the unidirectional weave, which effectively forms a layer or sheet 36.

The load bearing fibers 32 include at least two different types of material. Some embodiments include at least one polymer and another type of material such as carbon or another organic material. One of the materials is selected to at least partially melt for bonding the load bearing fibers 32 together. The material that provides the bonding has properties including a melting point that allows for at least partially melting that material without compromising the mechanical properties of another material that at least some of the other load bearing fibers 32 are made.

For discussion purposes, the illustrated example embodiment includes a first type of polymer material and a second type of polymer material that have different melting points. The first type of polymer material has a higher melting point than the melting point of the second type of polymer material. Including different types of polymer with different melting points allows for bonding the load bearing fibers 32 of the unidirectional weave together in a way that preserves the mechanical properties of the fibers made of the first type of polymer and maintains the configuration of the unidirectional weave. For example, the plurality of load bearing fibers 32 are bonded together by at least some of the second type of polymer that is at least partially melted without melting any of the first type of polymer material.

In some embodiments each of the load bearing fibers 32 comprises only one type of polymer. For example, some of the fibers 32 are made of the first type of polymer while others are made of the second type of polymer. In other embodiments at least some of the fibers 32 include more than one material and may include multiple polymers or at least one type of polymer and another type of material.

The unidirectional weave of fibers 32 includes a ratio of the first type of polymer to the second type of polymer (e.g., higher melting point polymer to lower melting point polymer) in a range from 4:1 to 1:1. Some embodiments include a ratio of the first type of polymer to the second type of polymer of 3:2. An example embodiment includes a ratio of 2:1. In preparation of the multi-polymer composite, the ratio of high melt point fibers to low melting point fibers depends on the processing and linear density of the fibers.

The unidirectional woven fibers are consolidated under a selected pressure at the specific temperature that the second or low melting point polymer material melts and forms a hot fluid that adheres the higher melting point fibers together. On cooling from the consolidated high temperature, the low melting point polymer fibers recrystallize, which forms a resin matrix in composite. The original mechanical properties of the low melting point polymer fibers will change because they are at least partially melted. Including the higher melting point material allows for preserving the mechanical properties of the higher melting point fibers. The final property of the composite provides the necessary characteristics for elevator system operation when there are enough higher melting point fibers, such as having more higher melting point fibers than lower melting point polymer fibers.

Example higher melting point and high strength polymers include liquid crystal polymer, aramid, polyhydroquinone-diimidazopyridine, polybenzimidazole, polypyridobisimidazole and polybenzoxazole. Example lower melting point and high strength polymers include ultrahigh molecular weight polyethylene and ultrahigh molecular weight polypropylene.

A jacket 38 covers the load bearing fibers in each of the illustrated example embodiments. The jacket 38 comprises a material that is suitable for establishing the desired traction with the traction sheave 26 to achieve the desired traction for controlling movement of the elevator car 22. Example materials that are useful include compressible materials, such as a thermoplastic material or an elastomer. In some embodiments the jacket 36 comprises a thermoplastic polyurethane material.

Figure 4:
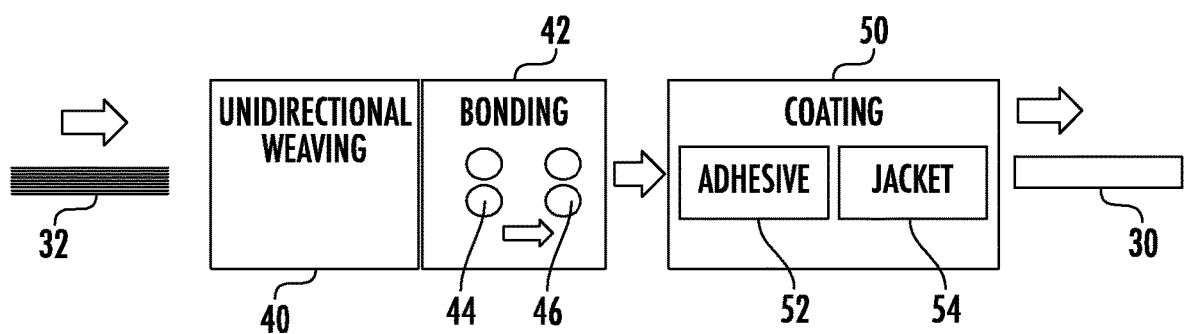
FIG. 4 schematically illustrates selected features of a process for making an elevator load bearing member like those shown in FIGS. 2 and 3.

FIG. 4 schematically illustrates an example method of making the disclosed load bearing member embodiments. The plurality of polymer load bearing fibers 32 are introduced or fed into unidirectional weaving equipment 40 where the fibers 32 are woven into the unidirectional weave. Then the woven fibers 32 are heated and pressed together by bonding equipment 42. For example, the bonding equipment 42 includes heating elements that subject the woven fibers 32 to a temperature that is at least as high as the melting point of the second type of polymer and less than the melting point of the first type of polymer. Such heating at least partially melts at least some of the second type of polymer without melting any of the first type of polymer. Any fibers composed of only the first type of polymer are not melted or altered during such heating.

In the illustrated example arrangement the unidirectionally woven fibers 32 are fed through and pressed between heated rollers 44. At least the rollers 44 heat the woven fibers 32 to a temperature sufficient to at least partially melt at least some of the second type of polymer. That melted polymer bonds the woven fibers 32 together.

In FIG. 4, the bonding equipment 42 includes cooling rollers 46 to facilitate shaping or maintaining the shape of the unidirectional weave of fibers 32 while any melted polymer recrystallizes.

Once the unidirectional weave is at a suitable temperature it is coated by coating equipment 50. In the illustrated example arrangement, the coating equipment 50 includes an adhesive applicator 52 that applies an adhesive coating onto the polymer load bearing fibers 32. A jacket application device 54, such as an extruder, applies the material of the jacket 38.

A load bearing member including a multi-polymer unidirectional weave of load bearing fibers as disclosed above provides improved strength characteristics compared to traditional elevator roping or belts that rely on steel wires as the primary load bearing components. Additionally, load bearing members consistent with the example embodiments of this disclosure are lighter weight and provide cost savings compared to previous configurations.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator load bearing member, comprising:
a unidirectional weave of a plurality of load bearing fibers including at least a first material and a second material, wherein at least some of the load bearing fibers comprise the first material and the second material, wherein a melting point of the first material is higher than a melting point of the second material, and wherein the plurality of load bearing fibers are bonded together by at least some of the second material that is at least partially melted; and
a coating over the plurality of load bearing fibers.

2. The elevator load bearing member of claim 1, wherein
the first material comprises a first type of polymer;
the second material comprises a second type of polymer;
at least some of the load bearing fibers comprise the first type of polymer; and
at least some others of the load bearing fibers comprise the second type of polymer.

3. The elevator load bearing member of claim 1, wherein the coating comprises a jacket that defines a traction surface of the elevator load bearing member.

4. The elevator load bearing member of claim 3, wherein the jacket comprises a thermoplastic material; and the coating comprises an adhesive between the thermoplastic material and at least some of the load bearing fibers.

5. The elevator load bearing member of claim 1, wherein a ratio of the first material to the second material is 1:1.

6. The elevator load bearing member of claim 1, wherein a ratio of the first material to the second material is 2:1.

7. The elevator load bearing member of claim 1, wherein a ratio of the first material to the second material is 3:2.

8. The elevator load bearing member of claim 1, wherein
the first material comprises at least one of carbon, liquid crystal polymer, aramid, polyhydroquinone-diimidazopyridine, polybenzimidazole, polypyridobisimidazole and polybenzoxazole; and
the second material comprises at least one of ultrahigh molecular weight polyethylene and ultrahigh molecular weight polypropylene.

9. An elevator load bearing member, comprising:
a unidirectional woven sheet of a plurality of load bearing fibers including at least a first material and a second material, the first material having a melting point that is higher than a melting point of the second material, wherein the plurality of load bearing fibers are bonded together by at least some of the second material that is at least partially melted, wherein at least some of the load bearing fibers comprise the first material and the second material; and
a coating over the plurality of load bearing fibers, the coating having a rectangular cross section defining a width of the elevator load bearing member, wherein the sheet of the plurality of load bearing members is continuous and extends across a majority of the width.

10. The elevator load bearing member of claim 9, wherein
the first material comprises a first type of polymer;
the second material comprises a second type of polymer;
at least some of the load bearing fibers comprise the first type of polymer; and
at least some others of the load bearing fibers comprise the second type of polymer.

11. The elevator load bearing member of claim 9, wherein the coating comprises a jacket that defines a traction surface of the elevator load bearing member.

12. The elevator load bearing member of claim 11, wherein
the jacket comprises a thermoplastic material; and
the coating comprises an adhesive between the thermoplastic material and at least some of the load bearing fibers.

13. The elevator load bearing member of claim 9, wherein a ratio of the first material to the second material is 1:1.

14. The elevator load bearing member of claim 9, wherein a ratio of the first material to the second material is 2:1.

15. The elevator load bearing member of claim 9, wherein a ratio of the first material to the second material is 3:2.

16. The elevator load bearing member of claim 9, wherein
the first material comprises at least one of carbon, liquid crystal polymer, aramid, polyhydroquinone-diimidazopyridine, polybenzimidazole, polypyridobisimidazole and polybenzoxazole; and
the second material comprises at least one of ultrahigh molecular weight polyethylene and ultrahigh molecular weight polypropylene.

* * * * *